(12) United States Patent
Chen et al.

(10) Patent No.: US 9,054,935 B1
(45) Date of Patent: Jun. 9, 2015

(54) OFDM-BASED ACOUSTIC COMMUNICATIONS SYSTEM

(71) Applicant: Jinghong Chen, Nanjing (CN)

(72) Inventors: Jinghong Chen, Nanjing (CN); Xiangning Chen, Nanjing (CN); Jingzhun Feng, Nanjing (CN)

(73) Assignee: Jinghong Chen, Nanjing (CN)

( * ) Notice: Subject to any disclaimer, the term of this patent is extended or adjusted under 35 U.S.C. 154(b) by 0 days.

(21) Appl. No.: 14/599,573

(22) Filed: Jan. 19, 2015

(51) Int. Cl.
*H04L 27/28* (2006.01)
*H04L 27/26* (2006.01)

(52) U.S. Cl.
CPC ........ *H04L 27/2666* (2013.01); *H04L 27/2634* (2013.01); *H04L 27/265* (2013.01); *H04L 27/2662* (2013.01)

(58) Field of Classification Search
USPC ................ 375/218, 260, 265, 285, 295, 316, 375/340–341, 346, 348, 350; 455/40; 367/134; 340/850
See application file for complete search history.

(56) References Cited

U.S. PATENT DOCUMENTS

| | | | | |
|---|---|---|---|---|
| 6,130,859 | A * | 10/2000 | Sonnenschein et al. | 367/134 |
| 7,711,322 | B2 * | 5/2010 | Rhodes et al. | 455/40 |
| 2004/0137929 | A1* | 7/2004 | Jones et al. | 455/517 |
| 2005/0219068 | A1* | 10/2005 | Jones et al. | 341/50 |
| 2006/0018458 | A1* | 1/2006 | McCree et al. | 379/406.01 |
| 2006/0018460 | A1* | 1/2006 | McCree | 379/406.08 |
| 2008/0317260 | A1* | 12/2008 | Short | 381/92 |
| 2011/0029845 | A1* | 2/2011 | Zhou et al. | 714/776 |
| 2013/0038462 | A1* | 2/2013 | Abdi | 340/850 |

* cited by examiner

*Primary Examiner* — Khanh C Tran
(74) *Attorney, Agent, or Firm* — CBM Patent Consulting, LLC (57) ABSTRACT

Disclosed is an orthogonal frequency division multiplexing (OFDM)-based acoustic communications system. At an acoustic transmitting end, original data is modulated through channel coding into an acoustic signal of a data frame formed by multiple OFDM symbols and the acoustic signal is transmitted through a loudspeaker; at an acoustic receiving end, after a microphone receives the acoustic signal, and the acoustic signal is restored to the original data through demodulation and channel decoding. In a communication process, symbol synchronization is implemented through pilot information, and data frame synchronization is implemented in a manner of inserting baker codes, thereby simplifying processing, having a low bit error rate, improving acoustic communication efficiency, promoting development of acoustic communication, and having a good application prospect.

8 Claims, 8 Drawing Sheets

OFDM-BASED ACOUSTIC COMMUNICATIONS SYSTEM

The application claims priority to Chinese application Ser. No. 201410499592.6, filed on Sep. 25, 2014 and entitled "OFDM-based acoustic communications system", which is hereby incorporated herein by reference.

TECHNICAL FIELD

The present invention relates to an OFDM-based acoustic communications system, and belongs to the field of wireless communications technologies.

BACKGROUND

For an acoustic frequency less than 24 kHz, existing video and voice play devices and receiving apparatuses can be fully used, and specially-customized loudspeakers and microphones are not needed. This acoustic frequency cannot be easily perceived by people's ears, and does not cause too much influences on people's daily life; therefore, acoustic communication is widely applied. However, in a conventional field of acoustic communications technologies, a processing process is complex, and a bit error rate is relatively high, which suppresses acoustic communication efficiency, and hinders development of acoustic communication.

The orthogonal frequency division multiplexing (OFDM) technology is a multi-carrier digital modulation technology. Although the concept of OFDM exists for a long time, people recently realizes that OFDM is a good way to implement high-speed bidirectional wireless data communication, and OFDM is commonly known in electronic communication and is not involved in the field of acoustic communication technologies. How to apply the OFDM technology in the acoustic communication to simplify a processing process, reduce a bit error rate, and improve communication efficiency is a technical problem currently to be solved.

SUMMARY

An objective of the present invention is to overcome a problem that acoustic communication efficiency is suppressed and development of acoustic communication is hindered, which are caused by the fact that a processing process of conventional acoustic communication is complex, and a bit error rate is relatively high. The present invention provides an OFDM-based acoustic communications system, which simplifies processing, reducing a bit error rate, improve efficiency and synchronization of acoustic communication, and has a good application prospect.

To achieve the foregoing objective, the following technical solutions are used in the present invention:

An OFDM-based acoustic communications system includes an acoustic transmitting end and an acoustic receiving end, where the acoustic transmitting end includes a channel coding module, a signal modulation module, a D/A conversion module, and a loudspeaker that are connected in sequence; the acoustic receiving end comprises a microphone, an A/D conversion module, a signal demodulation module, and a signal decoding module; the channel coding module is configured to receive original data; the signal decoding module is configured to output the original data; and data transmission is performed between the loudspeaker and the microphone through a communications channel of less than 24 kHz, the channel coding module includes a first BCH coding unit, an interleaving unit, and a second BCH unit that are connected in sequence, to extend the original data to obtain extended data;

the channel decoding module includes a first BCH decoding unit, a de-interleaving unit, and a second BCH decoding unit, to restore the extended data to the original data;

the signal modulation module modulates the extended data based on OFDM, divides a channel into multiple orthogonal sub-channels, converts an extended data signal into concurrent low-speed sub-data streams, and modulates the sub-data streams onto each sub-channel for transmission, and comprises a symbol mapping unit, an IDFT unit, and a signal extension unit that are connected in sequence, wherein the symbol mapping unit receives the extended data output by the channel coding module, and the signal extension unit outputs a digital voice signal to the D/A conversion module; and the signal demodulation module demodulates the received digital voice signal based on the OFDM, divides one channel into multiple orthogonal sub-channels, converts the digital voice signal into extended data, and demodulates the extended data onto the converted channel for transmission, and comprises a DFT unit, a synchronization capturing unit, and a symbol inverse-mapping unit that are connected in sequence, where the DFT unit is configured to receive the digital voice signal output by the A/D conversion module, the symbol inverse-mapping unit outputs the extended data to the signal decoding module, and if failing in capturing a data signal, the synchronization capturing unit returns a feedback to the DFT unit through a sliding unit.

In the OFDM-based acoustic communications system, the symbol mapping unit is configured to group the extended data, divide a channel into multiple orthogonal sub-channels, and map each group of data to one OFDM symbol, where a conversion process is: allocating each bit in each group of data to a corresponding sub-channel according to a constellation diagram, where the sub-channel includes a data signal channel, a constant signal channel, a zero-power signal channel, and a baker code signal channel, the data signal channel is used for assigning transmitted data to each data channel, the constant signal channel is used for synchronizing an OFDM symbol, the zero-power signal channel is used for correcting a frequency, and the baker code channel uses positions of specific points in the constellation diagram as +1 and −1, to implement frame synchronization.

In the OFDM-based acoustic communications system, the symbol inverse-mapping unit draws a constellation diagram according to strength and a phase of signal outputting of the synchronization capturing unit, and restores the extended data according to the constellation diagram.

In the OFDM-based acoustic communications system, the signal extension unit is configured to reduce energy leakage when handover is performed between two adjacent OFDM symbols, where a part of original signal prolongation needs to be copied as a transition area; to ensure periodicity of a signal, a tail signal of the original signal needs to be copied as a front transition area and a guard interval, a head signal of the original signal needs to be copied as a back transition area, a back transition area of a previous OFDM symbol overlaps with a front transition area of a later OFDM symbol, and gradient window functions of the front and back transition areas respectively are:

$$f1(x)=\tfrac{1}{2}(\cos(x)+1), x\in(\pi,2\pi); f2(x)=\tfrac{1}{2}(\cos(x)+1), x\in(0,\pi).$$

In the OFDM-based acoustic communications system, a guard interval area is set between the front transition area and the original signal, and the guard interval area is a prolongation of the tail signal of the original signal.

In the OFDM-based acoustic communications system, the synchronization capturing unit has two capturing cases:

(1) a start position of a DFT window falls in a cyclic prefix, a sampling value comprised in the DFT window is a value in the OFDM symbol, and then interference between symbols does not exist, demodulation is performed correctly, and synchronization capturing succeeds; and (2) a start position of a DFT window falls beyond the cyclic prefix, a sampling value comprised in the DFT window comprises a value of a next OFDM symbol, and then interference between symbols exists, synchronization capturing fails, the DFT window needs to be slide backwards through the sliding unit, and demodulation is performed again, so that the demodulation is performed correctly, and synchronization capturing succeeds.

In the OFDM-based acoustic communications system, the DFT window is slid backwards through the sliding unit, and a calculation process of a sliding offset is:

(1) assuming that a length of a signal sample generated by the IDFT unit is L, a length of the extended data is 2.75 L;

(2) transition areas of the two OFDM symbols overlap with each other, and the transition area is 0.25 L, and then an interval between heads of two OFDM symbols is 2.75 L−0.25 L=2.5 L; and (3) a length of the DFT window is L, and a sliding distance is 2.5 L/2=1.25 L.

In the OFDM-based acoustic communications system, each OFDM symbol is configured with one bit of baker code, the baker code is saved in a shift register in sequence, and a length of the shift register is equal to a length of the baker code; when a sharp peak of a baker code recognizer of the receiving end occurs, a start position and an end position of a frame are determined to implement frame synchronization.

The beneficial effects of the present invention are as follows: in the OFDM-based acoustic communications system provided in the present invention, at an acoustic transmitting end, original data is modulated through channel coding into an acoustic signal of a data frame formed by multiple OFDM symbols and the acoustic signal is transmitted through a loudspeaker; at an acoustic receiving end, after a microphone receives the acoustic signal, and the acoustic signal is restored to the original data through demodulation and channel decoding. In a communication process, symbol synchronization is implemented through pilot information, and data frame synchronization is implemented in a manner of inserting baker codes, thereby simplifying processing, having a low bit error rate, improving acoustic communication efficiency, promoting development of acoustic communication, and having a good application prospect.

DESCRIPTION OF THE EMBODIMENTS

The following further describes the present invention with reference to the accompanying drawings of the specification. The following embodiments are merely used to describe the technical solutions of the present invention clearly, rather than limiting the protection scope of the present invention.

Figure 1:
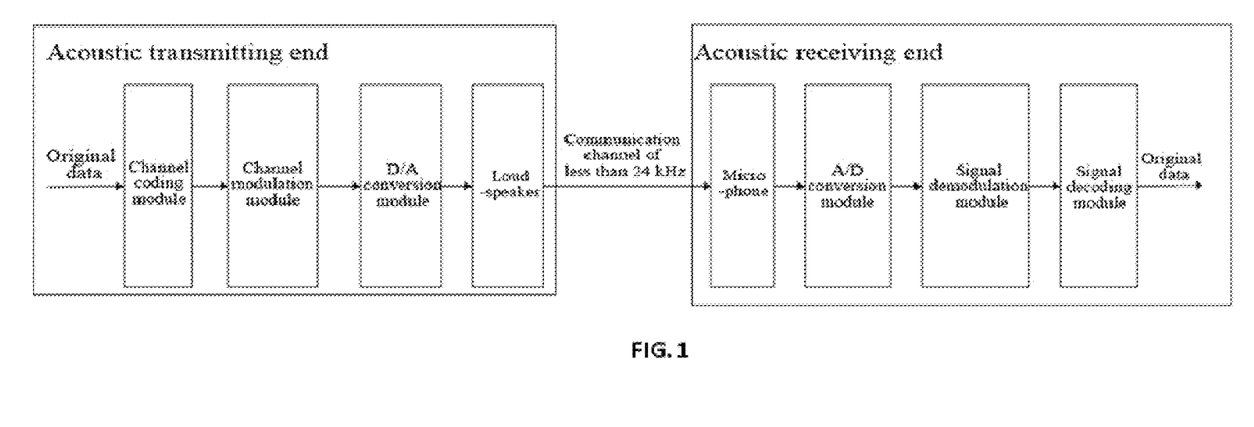
FIG. 1 is a system block diagram of an OFDM-based acoustic communications system according to the present invention.

As shown in FIG. 1, an OFDM-based communications system in the present invention includes an acoustic transmitting end and an acoustic receiving end. The acoustic transmitting end includes a channel coding module, a signal modulation module, a D/A conversion module, and a loudspeaker that are connected in sequence, and the acoustic receiving end includes a microphone, an A/D conversion module, a signal demodulation module, and a signal decoding module that are connected in sequence. The channel coding module is configured to receive original data; the signal decoding module is configured to output original data, where the original data is content data of information needing to be transmitted, and the original data may be any binary data, is not limited to voice data, and includes, but not limited to, data such as text, pictures, video, and audio. Digital audio data is generated in the signal modulation module. Extension refers to that monitoring data is added, so that an accumulated error can be corrected in a communication process. Data transmission is performed between the loudspeaker and the microphone through a communications channel of less than 24 kHz, where for an acoustic frequency of less than 24 kHz, existing video and audio play devices and receiving apparatuses can be fully used, specially-customized loudspeakers and microphones are not needed, and this frequency cannot be easily perceived by ears of people, which may not cause too many effects on people's daily life.

Figure 2:
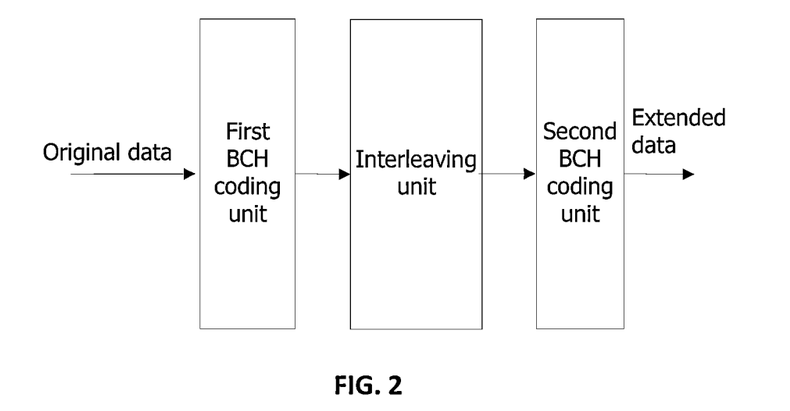
FIG. 2 is a system block diagram of a channel coding module according to the present invention.
Figure 3:
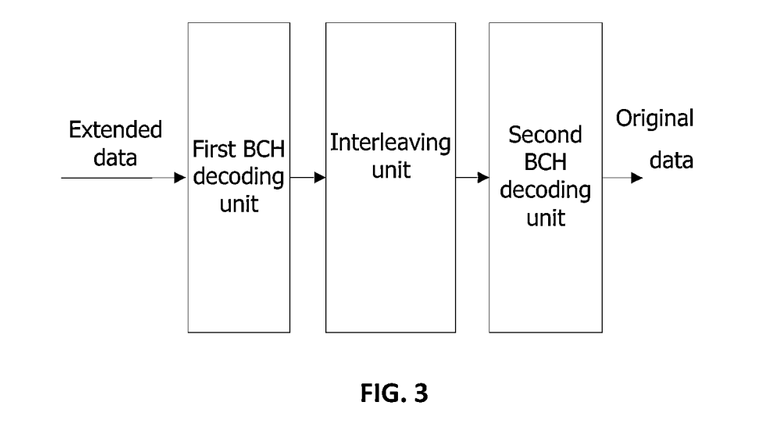
FIG. 3 is a system block diagram of a channel decoding module according to the present invention.

As shown in FIG. 2, the channel coding module includes a first BCH coding unit, an interleaving unit, and a second BCH coding unit that are connected in sequence, to extend voice data to obtain extended data;

As shown in FIG. 3, the channel decoding module includes a first BCH decoding unit, a de-interleaving unit, and a second BCH decoding unit that are connected in sequence, to restore the extended data to the voice data;

Due to various reasons, during transmission of an audio digital signal, error code is generated in a data stream being transmitted. By using channel coding and decoding modules, a digital code stream is corresponding processed, which has certain error correction capability and anti-interference capability, and can avoiding occurrence of error code during code stream transmission to a great extent.

Figure 4:
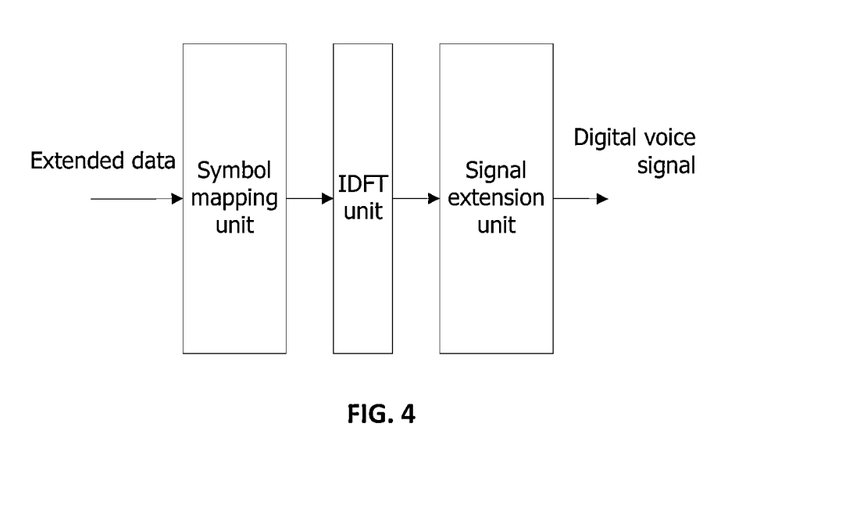
FIG. 4 is a system block diagram of a signal modulation module according to the present invention.

As shown in FIG. 4, the signal modulation module modulates the extended data based on the OFDM, divides a channel into multiple orthogonal sub-channels, converts an extended data signal into concurrent low-speed sub-data streams, and modulates the sub-data streams onto each sub-channel for transmission, and includes a symbol mapping unit, an IDFT unit, and a signal extension unit that are connected in sequence. The symbol mapping unit receives the extended data output by the channel coding module, and the signal extension unit outputs a digital voice signal to the D/A conversion module.

Figure 5:
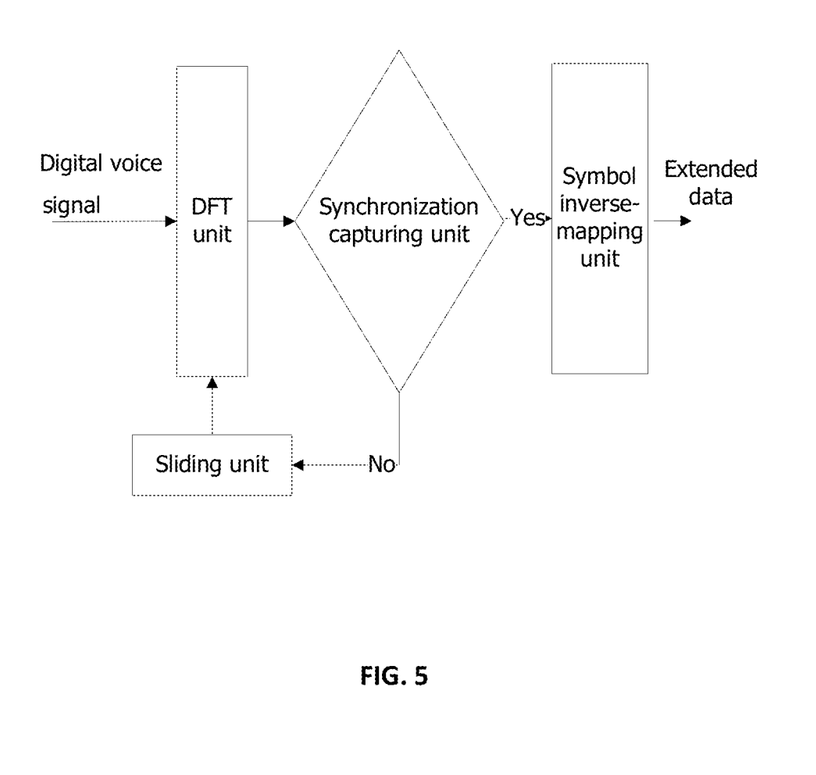
FIG. 5 is a system block diagram of a signal demodulation module according to the present invention.

As shown in FIG. 5, the signal demodulation demodulates the received digital voice signal based on the OFDM, converts multiple orthogonal sub-channels into one channel, converts the digital voice signal into the extended data, and demodulates the extended data onto the converted channel for transmission, and includes a DFT unit, a synchronization capturing unit, and a symbol inverse-mapping unit that are connected in sequence. The DFT unit is configured to receive the digital voice signal output by the A/D conversion module. The symbol inverse-mapping unit outputs the extended data to the signal decoding module. If failing in capturing a data signal, the synchronization capturing unit returns a feedback to the DFT unit through a sliding unit.

Figure 6:
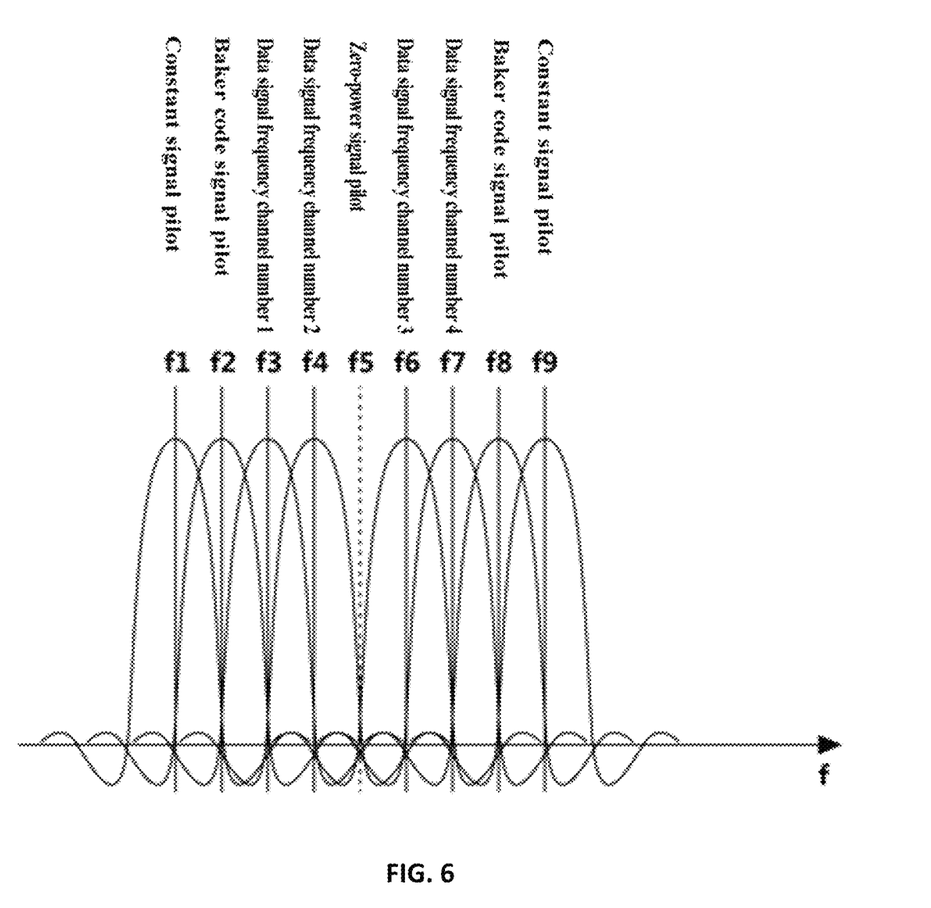
FIG. 6 is a schematic diagram of usage allocation of a sub-channel according to the present invention.

After data is grouped, the symbol mapping unit maps each group of data into one OFDM symbol. A specific process is: each bit in each group of data is assigned to a corresponding sub-channel according to a constellation diagram, where frequencies of 0 to 24 kHz are divided into multiple orthogonal sub-channels (a signal converted through DFT is definitely orthogonal, and the number of divided channels is equal to a half of the number of points of DFT), sub-channels that people's ears cannot easily perceive are assigned for different usages (a data channel, a baker code channel, a zero-power channel, and a constant signal channel). Assuming that 25 sub-channels are divided through 50-point DFT, and a bandwidth of each sub-channel is 1 kHz, if frequencies that people's ears cannot easily perceive are 15 kHz to 24 kHz, 10 sub-channels, namely, sub-channel 16 to sub-channel 25, are divided for different usages. Data is mapped to each sub-channel in a manner of the constellation diagram, for example, for BPSK modulation, 1 bit may be mapped to each channel; for QPSK modulation, 2 bits may be mapped to each channel; for 8 PSK modulation, 3 bits may be mapped to each channel; and for QAM modulation, 4 bits may be mapped to each channel. Different modulation manners correspond to different constellation diagrams. The data signal channel distributes, to each data channel, data needing to be transmitted. The baker code channel uses positions of specific points in the constellation diagram as +1 and −1, to implement frame synchronization. The zero-power signal channel does no send any data, where power at this point is 0, which is used for frequency correction. The constant signal channel fixedly sends a constant signal, and inserts a constant signal pilot (used for symbol synchronization, channel estimation, and channel balancing), a zero-power signal pilot (used for verifying symbol synchronization), and a baker code signal pilot (used for frame synchronization) into corresponding channels. The symbol inverse-mapping unit performs an inverse process, and symbol mapping is shown in FIG. 6.

Strength of the constant signal channel and the phase signal are known, and the symbol inverse-mapping unit may perform normalization process on strength of another channel through the strength of the channel, to calculate an attenuation value or a gain value of an overall signal. An offset value $\tau$ during the demodulation can be known through the formula (1):

$$\tau = (\theta - \theta')N/2\pi k \quad (1)$$

where N is the number of points during DFT, k is the $k^{th}$ point after conversion, that is, the $k^{th}$ sub-channel, k is conjugate to N/2; $\theta$ is an actual phase of this point, $\theta'$ is a phase obtained through calculation by using the received signal (when the start position is aligned, $\theta=\theta'$, and an offset $\tau=0$ is obtained through calculation according to the foregoing formula; when the start position is not aligned, $\theta$ is not equal to $\theta'$, that is, an offset $\tau$ is obtained through calculation according to the foregoing formula).

When strength and a phase of another signal are corrected according to the constant signal, a constellation diagram can be drawn according to the corrected strength and phase, and corresponding data is obtained according to the constellation diagram.

In the present invention, multiple sub-channels can be modulated simultaneously by using the IDFT unit, which saves a high pass filter device. A low pass signal does not need to be filtered when a digital voice signal is output.

In the present invention, multiple sub-channels can be demodulated simultaneously by using the DFT unit, which saves a high pass filter device. A low pass signal does not need to be filtered when a digital voice signal is input.

Figure 7:
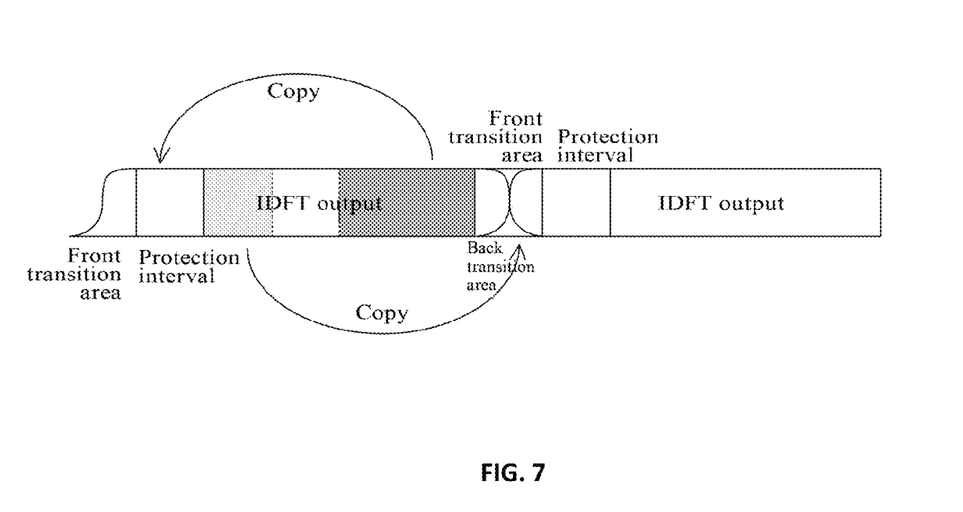
FIG. 7 is a schematic diagram of extended data according to the present invention.

The signal extension unit is configured to avoid energy leakage when handover is performed between two adjacent OFDM symbols. As shown in FIG. 7, a part of original signal prolongation needs to be copied as a transition area. To ensure periodicity of a signal, a tail signal of an original signal needs to be copied as a front transition area and a guard interval, a head signal of the original signal is used as a back transition area, and a back transition area of a previous OFDM symbol overlaps with a front transition area of a later OFDM symbol. Gradient window functions of the front and back transition area respectively are:

$$f1(x)=\tfrac{1}{2}(\cos(x)+1), x\in(\pi,2\pi); f2(x)=\tfrac{1}{2}(\cos(x)+1), x\in(0,\pi),$$

The gradient window function of the transition area and a superposing manner shorten the length of the transition area, and reduces a value of energy leakage, so that during symbol handover, people's ears cannot easily perceive the change.

A guard interval area is set between the front transition area and the original signal, and the guard interval area is a prolongation of the tail signal of the original signal.

Figure 8:
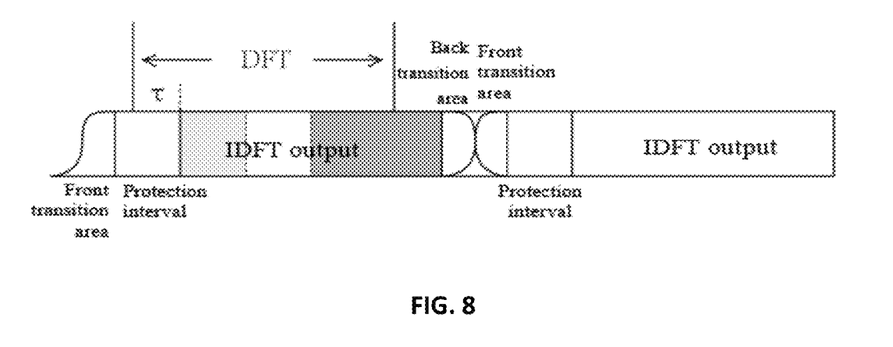
FIG. 8 is a schematic diagram of synchronization capturing when a start position of a DFT window falls in a cyclic prefix according to the present invention.
Figure 9:
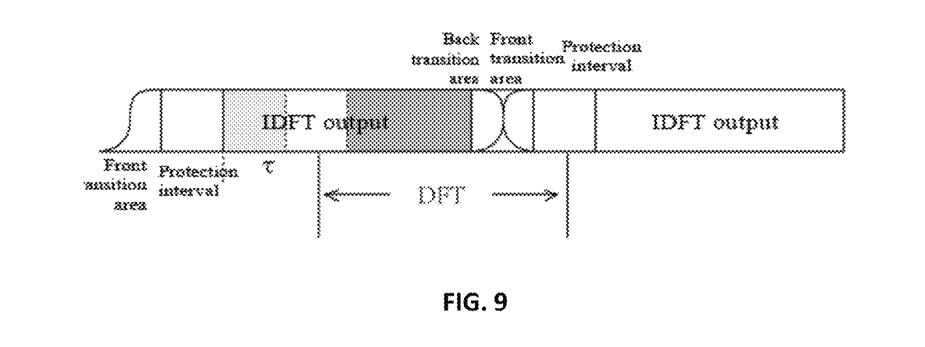
FIG. 9 is a schematic diagram of synchronization capturing when a start position of a DFT window falls beyond a cyclic prefix according to the present invention.

The synchronization capturing unit has two capturing cases, and a timing offset during the demodulation is $\tau$ samplings:

(1) as shown in FIG. 8, a start position of the DFT window falls in a cyclic prefix, a sampling value included in the DFT window is a value within the OFDM symbol, and then interference between symbols does not exist, demodulation is performed correctly, and synchronization capturing succeeds; and (2) as shown in FIG. 9, a start position of the DFT window falls beyond the cyclic prefix, a sampling value included in the DFT window includes a value of a next OFDM symbol, and then interference between symbols exists, synchronization capturing fails, the DFT window is slid backwards through the sliding unit, and demodulation is performed again, so that demodulation is performed correctly, and synchronization capturing succeeds.

The DFT window is slid backwards through the sliding unit, and a calculation process of a sliding offset is:

(1) assuming that a length of a signal sample generated by the IDFT unit is L, a length of the extended data is 2.75 L, which specifically is: 0.5 L at the tail of the original signal is copied as the front transition area and the guard interval, and 2 L entire original signals and 0.25 L at the head of the original signal are copied as the back transition area;

(2) transition areas of the two OFDM symbols overlap with each other, and the transition area is 0.25 L, and then an interval between heads of two OFDM symbols is 2.75 L−0.25 L=2.5 L; and (3) a length of the DFT window is L, and a sliding distance is 2.5 L/2=1.25 L.

Each OFDM symbol is configured with one bit of baker code, the baker code is saved in a shift register in sequence, and a length of the shift register is equal to the length of the baker code; when a sharp peak of a baker code recognizer of the receiving end occurs, a start position and an end position of a frame are determined to implement frame synchronization. The principle of the baker code recognizer is as follows: the baker code is saved in the shift register in sequence; when the baker code in each shift register is the same as preset baker code, the shift register outputs one level, output of each shift register is added through a summator, and when the baker code satisfies the output of the summator, the peak occurs.

A specific embodiment is introduced according to the OFDM-based acoustic communications system in the present invention.

Assuming that 256 bits of original data are sent on each frame (it is extended to 1024 bits after channel coding), 16 data transmission sub-carriers are used, and a QPSK constellation diagram (2 bit) is used, data of each frame has 32 OFDM symbols (1024/16/2=32), sampling accuracy of a digital voice signal is 16 bits, a sampling frequency is 44.1 kHz, 640 sampling points are used as one OFDM symbol; therefore a length of a signal of each frame is: 32*640/44100≈0.4644 (seconds), to complete the process.

Channel Coding and Decoding

Figure 10:
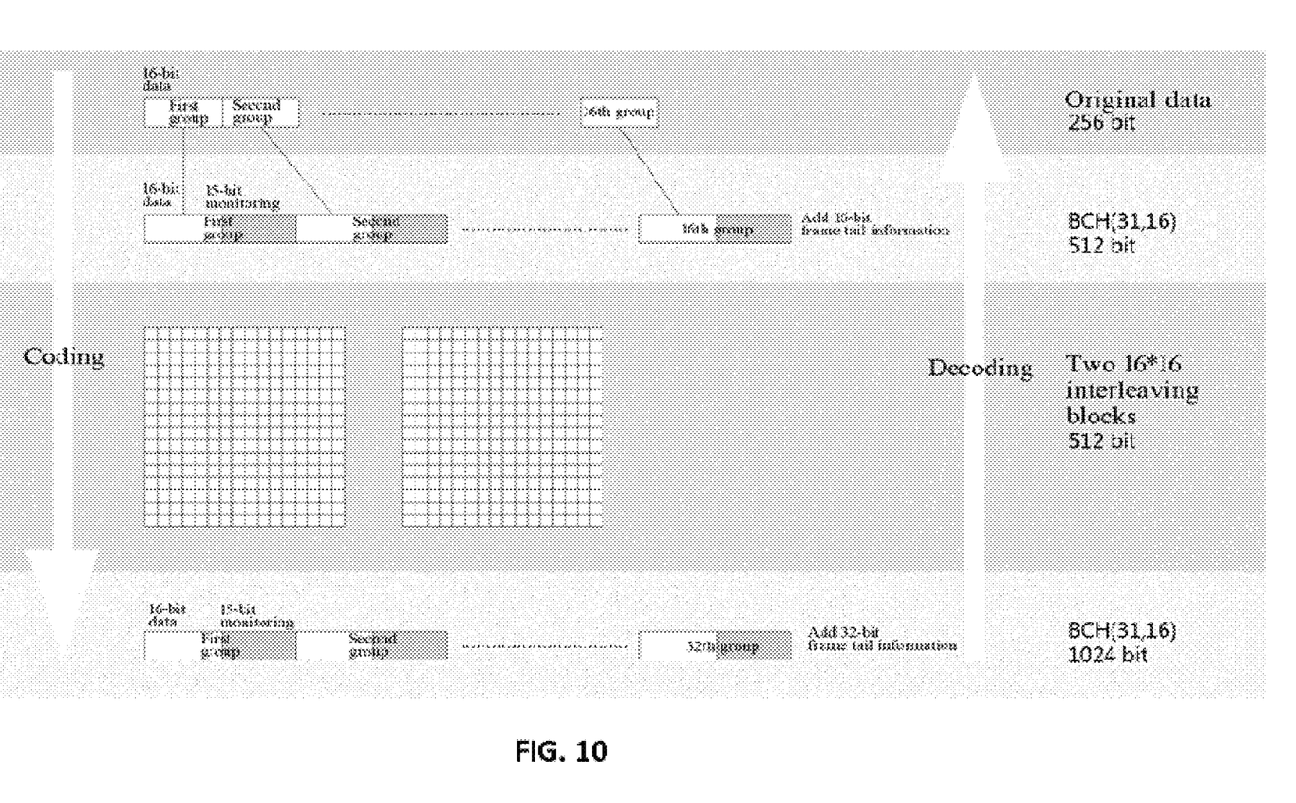
FIG. 10 is a schematic diagram of coding and decoding according to an embodiment of the present invention.

The following coding process is performed on original data of each frame:

(1) the original data is divided in to 16 groups, BCH (31, 16) coding is performed on each group of 16 bits, to obtain data of 496 bits, and frame tail information of 16 bits is added again;

(2) data is put to two 16 bit*16 bit interleavers in sequence, and then they are taken out in sequence;

(3) data is divided into 32 groups, BCH (31, 16) coding is performed on each group of 16 bits, to obtain data of 992 bits, and frame tail information of 32 bits is added again, where the specific coding and decoding processes are the prior art known by a person skilled in the art, and the decoding process is an inverse process of the coding process, and the coding and decoding processes are shown in FIG. 10.

Signal Modulation and Demodulation (1) symbol mapping and inverse-mapping

Frequency bands of 17 kHz to 21 kHz are divided into 23 sub-channels (16 sub-channels are used for transmitting a data signal, 3 sub-channels are used for transmitting a constant signal, 2 sub-channels are used for transmitting a baker code signal, and 2 sub-channels are used for transmitting a zero-power signal). Because the signal is generated through 256-point IDFT, there are 128 frequency channel numbers, where the data signal frequency channel numbers are: 99, 100, 101, 102, 103, 104, 105, 106, 107, 108, 110, 111, 112, 113, 114, 115;

the constant signal frequency channel numbers are: 98, 119, 120;

the baker code signal frequency channel numbers are: 109, 118; and the zero-power signal frequency channel numbers are: 116, 117.

Figure 11:
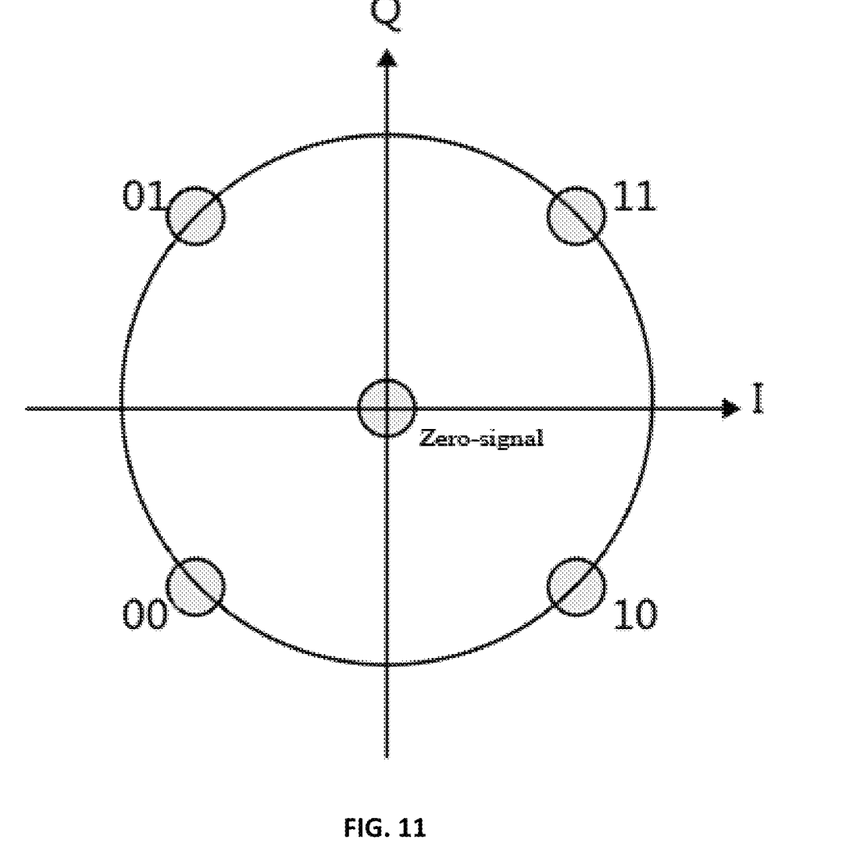
FIG. 11 is a constellation diagram of data modulation in a QPSK manner according to an embodiment of the present invention.

Data is modulated in a QPSK manner, a constellation diagram shown in FIG. 11 is used; in the data signal frequency channel numbers, data of 2 bits are transmitted on each frequency channel number; in the constant signal frequency channel numbers, "11" is transmitted constantly; in the baker code signal frequency channel numbers, "11" indicates "+", and "00" indicates "−"; in-frame (remaining) OFDM symbols after transmission by using baker code of 13 bits is completed are used to transmit a zero-power signal; in the zero-power signal frequency channel numbers, the zero-power signal is sent.

Figure 12:
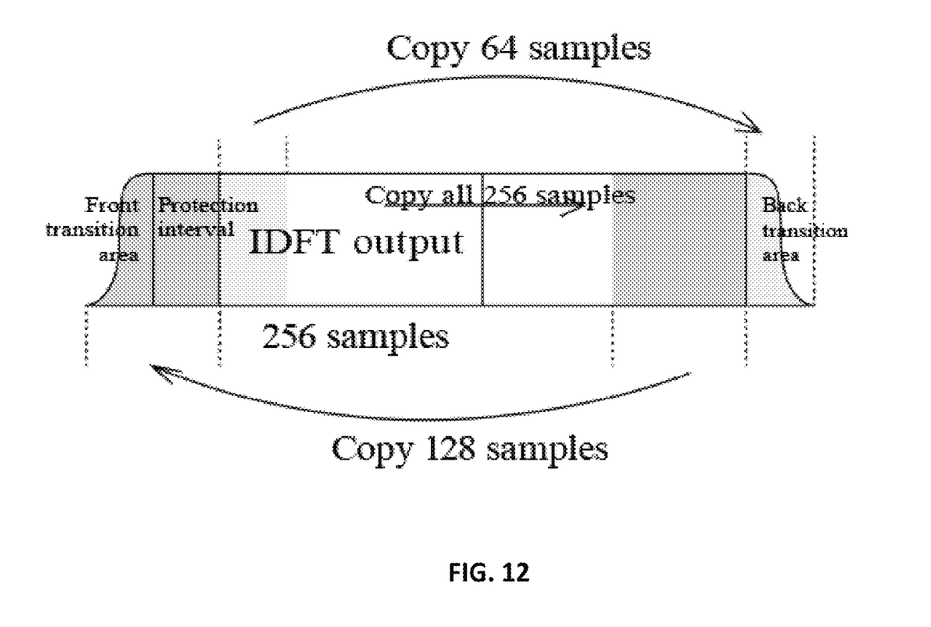
FIG. 12 is a schematic diagram of signal extension according to an embodiment of the present invention.

(2) signal extension a digital voice signal generated through the IDFT unit from the point being 256 is extended in a manner shown in FIG. 12.

(3) synchronization capturing and sliding

Figure 13:
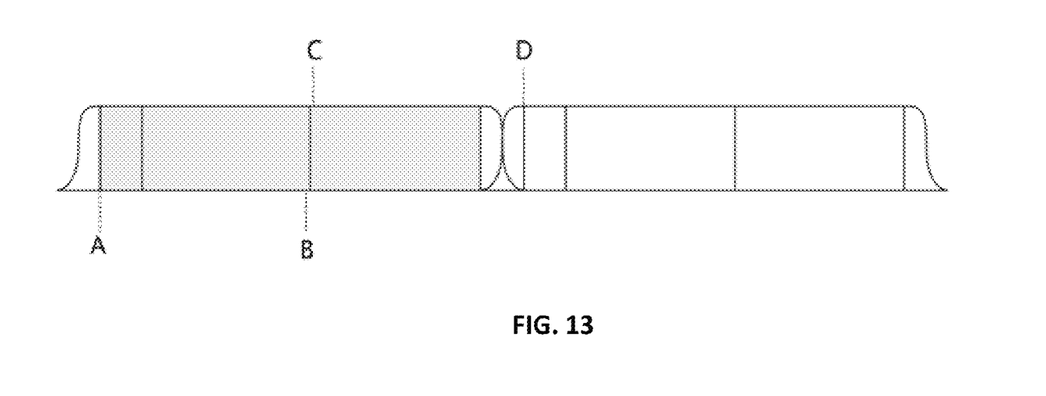
FIG. 13 is a schematic diagram of synchronization capturing and sliding according to an embodiment of the present invention.

When demodulation is performed through the DFT unit by using a 256-point sample window, a point of a start position of the demodulation window is demodulated. As shown in FIG. 12, when the demodulated start position of the DFT window is between A and B, the demodulation is performed correctly. As shown in FIG. 13, when the demodulated start position is between C and D, demodulation cannot be correctly performed, where AB=CD. That is, a probability that an initial capturing succeeds is 50%, and when the initial capturing fails, sliding is performed backwards by 320 samples, and the capturing can succeed, and symbol synchronization can be implemented after an average of 1.5 capturings; therefore the symbol synchronization efficiency is high. The symbol synchronization case is introduced by using specific numerical numbers, that the sampling length generated through IDFT is x, and a length after the extension is x+x+x/2+x/4=2.75x. Because transition areas of two adjacent OFDM symbols overlap with each other, an interval between heads of two adjacent OFDM symbols is 2.75x−x/4=2.5x, a length of a DFT window of each demodulation is x, and a sliding distance is 2.5x/2=1.25x; numerical values in the foregoing example are set according to this proportion, and then a symbol synchronization effect can be achieved after an average of 1.5 capturings.

(4) frame synchronization

When the 13th OFDM symbol in a frame is received, a sharp peak value occurs to the baker code, so as to start to determine start and end positions of the frame.

The foregoing displays and describes the basic principle and main features and advantages of the present invention. A person skilled in the art should understand: the foregoing embodiments do not limit the present invention. The foregoing embodiments and the specification merely describe the principle of the present invention, and without departing from the spirit and scope of the present invention, various modifications and changes can be made to the present invention, and these modifications and changes shall fall within the protection scope of the present invention. The protection scope of the present invention shall be subject to the appended claims and the equivalents thereof.

What is claimed is:

1. An orthogonal frequency division multiplexing (OFDM)-based acoustic communications system, comprising an acoustic transmitting end and an acoustic receiving end, wherein the acoustic transmitting end comprises a channel coding module, a signal modulation module, a D/A (digital-to-analog) conversion module, and a loudspeaker that are connected in sequence; the acoustic receiving end comprises a microphone, an A/D (analog-to-digital) conversion module, a signal demodulation module, and a signal decoding module; the channel coding module is configured to receive original data; the signal decoding module is configured to output the original data; and data transmission is performed between the loudspeaker and the microphone through a communications channel of less than 24 kHz, the channel coding module comprises a first BCH (Boss-Chaudhuri-Hocquenghem) coding unit, an interleaving unit, and a second BCH unit that are connected in sequence, to extend the original data to obtain extended data;

the channel decoding module comprises a first BCH decoding unit, a de-interleaving unit, and a second BCH decoding unit, to restore the extended data to the original data;

the signal modulation module modulates the extended data based on OFDM, divides a channel into multiple orthogonal sub-channels, converts an extended data signal into concurrent low-speed sub-data streams, and modulates the sub-data streams onto each sub-channel for transmission, and comprises a symbol mapping unit, an IDFT (inverse discrete Fourier transform) unit, and a signal extension unit that are connected in sequence, wherein the symbol mapping unit receives the extended data output by the channel coding module, and the signal extension unit outputs a digital voice signal to the D/A conversion module; and the signal demodulation module demodulates the received digital voice signal based on the OFDM, divides one channel into multiple orthogonal sub-channels, converts the digital voice signal into extended data, and demodulates the extended data onto the converted channel for transmission, and comprises a DFT unit (discrete Fourier transform), a synchronization capturing unit, and a symbol inverse-mapping unit that are connected in sequence, wherein the DFT unit is configured to receive the digital voice signal output by the A/D conversion module, the symbol inverse-mapping unit outputs the extended data to the signal decoding module, and if failing in capturing a data signal, the synchronization capturing unit returns a feedback to the DFT unit through a sliding unit.

2. The OFDM-based acoustic communications system according to claim 1, wherein the symbol mapping unit is configured to group the extended data, divide a channel into multiple orthogonal sub-channels, and map each group of data to one OFDM symbol, wherein a conversion process is: allocating each bit in each group of data to a corresponding sub-channel according to a constellation diagram, wherein the sub-channel comprises a data signal channel, a constant signal channel, a zero-power signal channel, and a baker code signal channel, the data signal channel is used for assigning transmitted data to each data channel, the constant signal channel is used for synchronizing an OFDM symbol, the zero-power signal channel is used for correcting a frequency, and the baker code channel uses positions of specific points in the constellation diagram as +1 and −1, to implement frame synchronization.

3. The OFDM-based acoustic communications system according to claim 1, wherein the symbol inverse-mapping unit draws a constellation diagram according to strength and a phase of signal outputting of the synchronization capturing unit, and restores the extended data according to the constellation diagram.

4. The OFDM-based acoustic communications system according to claim 1, wherein the signal extension unit is configured to reduce energy leakage when handover is performed between two adjacent OFDM symbols, wherein a part of original signal prolongation needs to be copied as a transition area; to ensure periodicity of a signal, a tail signal of the original signal needs to be copied as a front transition area and a guard interval, a head signal of the original signal needs to be copied as a back transition area, a back transition area of a previous OFDM symbol overlaps with a front transition area of a later OFDM symbol, and gradient window functions of the front and back transition areas respectively are:

$$f1(x)=\tfrac{1}{2}(\cos(x)+1), x\in(\pi,2\pi); f2(x)=\tfrac{1}{2}(\cos(x)+1), x\in(0,\pi).$$

5. The OFDM-based acoustic communications system according to claim 4, wherein a guard interval area is set between the front transition area and the original signal, and the guard interval area is a prolongation of the tail signal of the original signal.

6. The OFDM-based acoustic communications system according to claim 1, wherein the synchronization capturing unit has two capturing cases:

(1) a start position of a DFT window falls in a cyclic prefix, a sampling value comprised in the DFT window is a value in the OFDM symbol, and then interference between symbols does not exist, demodulation is performed correctly, and synchronization capturing succeeds; and (2) a start position of a DFT window falls beyond the cyclic prefix, a sampling value comprised in the DFT window comprises a value of a next OFDM symbol, and then interference between symbols exists, synchronization capturing fails, the DFT window needs to be slide backwards through the sliding unit, and demodulation is performed again, so that the demodulation is performed correctly, and synchronization capturing succeeds.

7. The OFDM-based acoustic communications system according to claim 6, wherein the DFT window is slid backwards through the sliding unit, and a calculation process of a sliding offset is:

(1) assuming that a length of a signal sample generated by the IDFT unit is L, a length of the extended data is 2.75 L;

(2) transition areas of the two OFDM symbols overlap with each other, and the transition area is 0.25 L, and then an interval between heads of two OFDM symbols is 2.75 L−0.25 L=2.5 L; and (3) a length of the DFT window is L, and a sliding distance is 2.5 L/2=1.25 L.

8. The OFDM-based acoustic communications system according to claim 1, wherein each OFDM symbol is configured with one bit of baker code, the baker code is saved in a shift register in sequence, and a length of the shift register is equal to a length of the baker code; when a sharp peak of a baker code recognizer of the receiving end occurs, a start position and an end position of a frame are determined to implement frame synchronization.

* * * * *